Feb. 9, 1926.
F. F. STARR
1,572,251
BATTERY CHARGING SYSTEM
Filed March 13, 1922
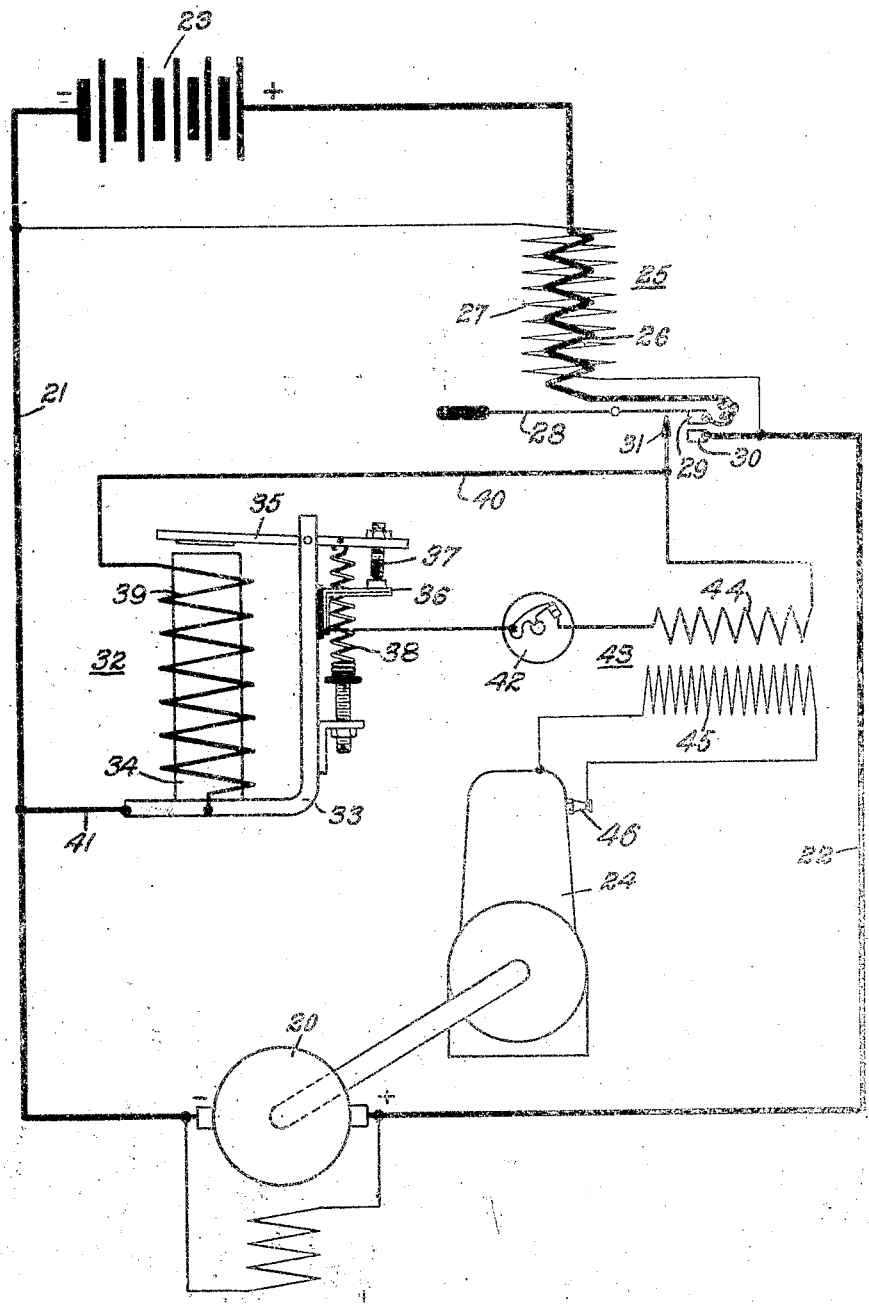

Patented Feb. 9. 1926.

1,572,251

UNITED STATES PATENT OFFICE.

FRANK F. STARR, OF DAYTON, OHIO, ASSIGNOR TO DELCO-LIGHT COMPANY, OF DAYTON, OHIO, A CORPORATION OF DELAWARE.

BATTERY-CHARGING SYSTEM.

Application filed March 13, 1922. Serial No. 543,135.

*To all whom it may concern:*

Be it known that I, FRANK F. STARR, a citizen of the United States of America, residing at Dayton, county of Montgomery, and State of Ohio, have invented certain new and useful Improvements in Battery-Charging Systems, of which the following is a full, clear, and exact description.

This invention relates to electrical battery charging systems wherein an internal-combustion engine, is connected with a dynamo electric machine adapted to operate either as a generator or to charge a storage battery or as a motor to crank the engine when the dynamo receives current from the battery.

In battery charging systems of this class various devices have been employed for discontinuing the battery charging when a battery has been fully charged, and this invention relates more particularly to that class of battery charging systems in which the operation of the engine is automatically discontinued, when the battery has attained a given voltage. It is well known in battery charging systems of this type, that the battery voltage which corresponds to a full charge at normal temperatures does not correspond to a full battery charge at temperatures below normal. For instance, when the battery being charged is at a temperature below normal, it has a higher resistance and for this reason it requires a higher voltage to fully charge the battery.

It is an object of this invention to provide battery charging systems wherein the battery will be fully charged irrespective of the temperature at which the charging takes place.

A further object is to provide a battery charging system of this type having means responsive to charging E. M. F. for automatically discontinuing the operation of the engine said means being controlled by temperature so that the charging voltage may be carried to a higher value in cold weather than in warm.

Other and further objects of the present invention will be apparent from the following description of an embodiment thereof, reference being had to the accompanying drawings, in which:

The figure of the drawing is a diagrammatic view of an electrical storage battery charging system embodying the invention.

Referring to the drawings 20 designates a dynamo electric machine supplying current through the battery circuit 21, 22 for charging the storage battery 23. Dynamo 20 may be operated either as a motor or a generator, and is herein shown directly connected with an internal-combustion engine 24. A starting switch 25 is connected in the battery circuit and includes a magnet having a series winding 26 and a shunt winding 27, and an armature 28 carrying contact 29 adapted to engage contact 30 to close the battery circuit.

To start the engine 24 armature 28 is moved to close the contacts 29 and 30. Current from the battery 23 then flows through the battery circuit 21, 22 and operates the dynamo electric machine 20 as a motor to drive the engine. When the engine becomes self-operative the dynamo electric machine 20 operates as a generator to supply current to the battery 23. The windings 26 and 27 of the starting switch are so arranged that when current is being supplied from the battery to operate 20 as a motor, they will oppose one another and the contacts 29 and 30 will not be closed unless the armature 28 is manually retained in circuit closing position. When dynamo 20 operates as a generator, windings 26 and 27 will operate cumulatively to hold the armature 28 in its raised position and thereby maintain the battery circuit closed at contacts 29 and 30.

Armature 28 in its circuit closing position also engages contact 31 and thereby serves to connect across the battery charging circuit the ignition cut-out relay 32 which will be now described. Relay 32 includes an L-shaped frame 33 of magnetic material carrying a magnet core 34, and an armature 35 in electrical circuit with said frame 33 and pivoted thereon so as to cooperate with the magnet core 34. Mounted on one arm of the frame 33 and insulated therefrom is a bi-metal contact member 36 adapted to cooperate with an adjustable contact 37 carried by the armature 35. The contacts 36 and 37 are held normally closed by a spring member 38 as shown. Mounted on the magnet core 34 is a winding 39 which at one end is grounded on the frame 33 and at the other end is connected by wire 40 with contact 31. Frame 33 is connected by wire 41 with wire 21 of the battery circuit. Coil 39 of the cut-out relay is thus connected across the battery circuit in the following manner; from one side 21 of the battery circuit through wire 41, frame 33, winding 39, wire 40, and contact 31 through the armature 28 to the opposite side 22 of the battery circuit. The bi-metal contact 36 is connected with the timer 42 and the primary winding 44 of the ignition coil 43 as shown, the secondary winding 45 being connected with the spark plug 46. The primary of the ignition circuit is then established across the battery circuit from wire 21 through wire 41, frame 33, armature 35, contact 37, bi-metal contact 36, timer 42, the primary 44, and contact 31 through the armature 28 to the other side 22 of the battery circuit. The bi-metal contact 36 is made of two metals having different coefficients of expansion, and is so arranged that at decreasing temperatures the contact 36 tends to move away from contact 37, which, by the action of the spring 38 is caused to keep the contact 36 remaining always in contact therewith. It thus appears that with decreasing temperatures contact 36 and 37 move in such direction as to increase the air gap between the magnet core 34 and the armature 35. With this increased air gap it will require a higher voltage across the winding 39 of the cut-out relay to actuate the armature 35 and cut off the ignition to stop the engine.

When the battery is being charged the operation of the cut-out relay and the ignition circuit is as follows: Current flows through the winding 39 of the cut-out relay but this current will not be sufficient to actuate the armature 35 to break the ignition circuit at 36, 37 until the voltage across the battery has reached the predetermined value corresponding to a full battery charge. When the battery is charged at a temperature lower than normal the bi-metal contact 36 will tend to recede from the contact 37 to increase the air gap between the armature 35 and the magnet core 34, and thereby increase the voltage which is necessary across the winding 39 to actuate the armature 35 as previously described. The bi-metal contact 36 is so arranged that the voltage required to interrupt the ignition circuit at 36, 37 is substantially the same as the voltage which corresponds to a full battery charge at different temperatures of operation.

As soon as the ignition circuit is interrupted the engine stops and battery current starts to flow into the generator, but when this occurs the windings 26 and 27 of the switch 25 oppose each other and the armature will be restored to the position shown due to the action of gravity or spring pressure if desired.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. In a battery charging system, the combination with an internal-combustion engine and a generator driven thereby; of a storage battery; and means for automatically disconnecting the storage battery from the generator when a certain battery voltage has been attained, said means including temperature responsive means permitting the battery voltage to reach relatively higher values as the temperature decreases.

2. In a battery charging system, the combination with an internal-combustion engine and a generator driven thereby; of a storage battery; and means for automatically disconnecting the storage battery from the generator when a certain battery voltage has been attained, said means including a magnet responsive to battery voltage, an armature actuated by said magnet and temperature responsive means for varying the air gap between the magnet and armature thereby permitting the battery voltage to reach relatively higher values as the temperature decreases.

3. In a battery charging system, the combination with an internal-combustion engine and a generator driven thereby; of electrical engine ignition means; a storage battery; a reverse current relay connecting the battery and generator; and voltage controlled means controlling the ignition means to stop the engine upon the attainment of a certain battery voltage, said means including temperature responsive means permitting the battery voltage to reach relatively higher values as the temperature decreases.

4. In a battery charging system, the combination with an internal-combustion engine and a generator driven thereby; of electrical engine ignition means; a storage battery; a reverse current relay connecting the battery and generator; voltage controlled means controlling the ignition means to stop the engine upon the attainment of a certain battery voltage, said means including a magnet controlled by voltage and an armature actuated thereby for controlling the ignition means, and temperature responsive means for varying the air gap between the magnet and armature thereby permitting the battery voltage to reach relatively higher values as the temperature decreases.

5. In a battery charging system, the combination with an internal-combustion engine and a generator driven thereby; of a storage battery; and means for automatically disconnecting the storage battery from the generator when a certain battery voltage has been attained, said means including a magnet, an armature adapted to be actuated by the magnet and temperature responsive means for so modifying the influence of the magnet on the armature as to permit the battery voltage to reach relatively higher values as the temperature decreases.

6. In a battery charging system, the combination with an internal-combustion engine and a generator driven thereby; of a storage battery; and means for automatically disconnecting the storage battery from the generator when a certain battery voltage has been attained, said means including a magnet, an armature adapted to be actuated by the magnet and temperature responsive means including a bi-metallic member for so modifying the influence of the magnet on the armature as to permit the battery voltage to reach relatively higher values as the temperature decreases.

7. In a battery charging system, the combination with an internal-combustion engine and a generator driven thereby; of a storage battery; and means for automatically disconnecting the storage battery from the generator when a certain battery voltage has been attained, said means including a magnet responsive to battery voltage, an armature adapted to be actuated by said magnet and temperature responsive means including a movable stop for the armature for varying the air gap between the magnet and armature thereby permitting the battery voltage to reach relatively higher values as the temperature decreases.

8. In a battery charging system, the combination with a prime mover and a generator driven thereby; of an electrical control circuit for the prime mover; a storage battery adapted to be charged by the generator; and means for automatically disconnecting the storage battery from the generator when a certain battery voltage has been attained, said means including a pair of cooperating contacts in said control circuit adapted to be moved to open or closed position, means for normally holding said contacts in one of said positions, means including a magnet for moving said contacts out of said position, and temperature responsive means cooperating with one of said contacts for so modifying the influence of the magnet to move said contacts as to permit the battery voltage to reach relatively higher values as the temperature decreases.

9. In an electric system, a prime mover, a generator connected thereto, a storage battery arranged to receive charging current from said generator, and means responsive to environment temperature adapted to discontinue the supply of charging current after a pre-determined voltage has been reached, said means arranged to vary the voltage limit inversely with variations in the environment temperature.

In testimony whereof I hereto affix my signature.

FRANK F. STARR.